United States Patent
Tochigi

(10) Patent No.: US 10,539,111 B2
(45) Date of Patent: Jan. 21, 2020

(54) CONTROL DEVICE FOR AN INTERNAL COMBUSTION ENGINE, VEHICLE INCLUDING THE SAME AND METHOD FOR THE SAME

(71) Applicant: TOYOTA JIDOSHA KABUSHIKI KAISHA, Toyota-shi, Aichi-ken (JP)

(72) Inventor: Kohei Tochigi, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 451 days.

(21) Appl. No.: 14/900,826

(22) PCT Filed: Jun. 24, 2014

(86) PCT No.: PCT/IB2014/001165
§ 371 (c)(1),
(2) Date: Dec. 22, 2015

(87) PCT Pub. No.: WO2014/207536
PCT Pub. Date: Dec. 31, 2014

(65) Prior Publication Data
US 2016/0153417 A1 Jun. 2, 2016

(30) Foreign Application Priority Data
Jun. 26, 2013 (JP) .................................. 2013-133419

(51) Int. Cl.
*F02N 11/08* (2006.01)
*F02D 17/04* (2006.01)
*F02D 29/02* (2006.01)

(52) U.S. Cl.
CPC .......... *F02N 11/0825* (2013.01); *F02D 17/04* (2013.01); *F02D 29/02* (2013.01)

(58) Field of Classification Search
CPC ............. F02N 11/0818; F02N 11/0822; F02N 11/0825; F02N 11/0829; F02N 11/0833;
(Continued)

(56) References Cited

U.S. PATENT DOCUMENTS 6,605,946 B1 * 8/2003 Yokoyama .......... F02N 11/0825
324/429
6,817,330 B1 * 11/2004 Ogawa ..................... B60H 1/04
123/179.4

(Continued)

FOREIGN PATENT DOCUMENTS

JP      2001-304008 A     10/2001
JP      2003-247439    *   3/2003   ........... F02N 1/0818
(Continued)

OTHER PUBLICATIONS

180205 Cold Regions Technical Digest No. 91-4, May 1991 Automotive Batteries at Low Temperatures.*
190605 Okazaki JP 2003 247439 machine translation (Year: 2003).*

*Primary Examiner* — Carl C Staubach
(74) *Attorney, Agent, or Firm* — Sughrue Mion, PLLC

(57) ABSTRACT

A control device for an internal combustion engine for executing idling stop. The control device includes a threshold setting unit and an execution prohibition unit. The threshold unit sets a threshold of a charging rate of a battery and sets the threshold when the battery temperature is low smaller than that when the battery temperature is high. The threshold is used for determining whether execution of the idling stop is permitted. The execution prohibition unit prohibits execution of the idling stop when the charging rate of the battery is less than the threshold. The threshold is set by the threshold setting unit.

15 Claims, 3 Drawing Sheets

(58) Field of Classification Search
CPC ............... F02N 11/0837; F02N 11/084; F02N 2250/02; F02N 11/0814; F02N 11/0844; F02D 17/04; F02D 29/02
See application file for complete search history.

(56) References Cited

U.S. PATENT DOCUMENTS

| | | | |
|---|---|---|---|
| 7,501,791 B2 | 3/2009 | Thimm et al. | |
| 8,170,778 B2* | 5/2012 | Ando | F02D 29/02 123/179.16 |
| 2002/0082765 A1* | 6/2002 | Schoch | F02N 11/0862 701/113 |
| 2004/0211381 A1* | 10/2004 | Ogawa | B60H 1/04 123/179.4 |
| 2005/0263121 A1* | 12/2005 | Tamagawa | F02N 11/08 123/179.3 |
| 2006/0021808 A1* | 2/2006 | McGee | B60K 6/445 180/65.235 |
| 2007/0170778 A1* | 7/2007 | Yamaguchi | B60K 1/00 307/10.1 |
| 2007/0255463 A1* | 11/2007 | Kikuchi | B60K 6/445 701/22 |
| 2008/0007205 A1* | 1/2008 | Thimm | F02N 11/0825 320/104 |
| 2009/0159351 A1* | 6/2009 | Ando | B60K 6/445 180/65.265 |
| 2009/0198438 A1* | 8/2009 | Jinno | B60H 1/04 701/110 |
| 2009/0204314 A1* | 8/2009 | Aoki | B60K 6/365 701/112 |
| 2010/0057323 A1* | 3/2010 | Jourdes | F02N 11/04 701/101 |
| 2010/0094526 A1* | 4/2010 | Ando | F02D 29/02 701/103 |
| 2011/0050179 A1* | 3/2011 | Mitani | F02N 11/0825 320/150 |
| 2012/0078457 A1* | 3/2012 | Tajima | B60K 6/48 701/22 |
| 2012/0245785 A1* | 9/2012 | Tamagawa | B60K 6/442 701/22 |
| 2014/0312626 A1* | 10/2014 | Yamoto | F02D 17/04 290/40 R |

FOREIGN PATENT DOCUMENTS

| | | |
|---|---|---|
| JP | 2003-247439 A | 9/2003 |
| JP | 2011-026993 A | 2/2011 |
| JP | 2011-054479 A | 3/2011 |
| JP | 2011-213310 A | 10/2011 |
| JP | 2013-024157 A | 2/2013 |
| WO | 2008023245 A2 | 2/2008 |

* cited by examiner

CONTROL DEVICE FOR AN INTERNAL COMBUSTION ENGINE, VEHICLE INCLUDING THE SAME AND METHOD FOR THE SAME

BACKGROUND OF THE INVENTION

1. Field of the Invention

The present invention relates to a control device for an internal combustion engine, a vehicle including the same and method for the same.

2. Description of Related Art

In recent years, in order to progress reduction in fuel consumption of a vehicle, a technology for executing idling stop of the internal combustion engine has been prevailing widely. For idling stop, the internal combustion engine which has been stopped temporarily has to be started with electric power of a battery. Thus, a care for a charging condition of the battery must be taken. Thus, there has been a proposed method in which the idling stop is prohibited when executing the idling stop based on a battery charging rate, a battery temperature is low, and unless the battery charging rate is high (e.g., Japanese Patent Application Publication No. 2011-54479 (JP 2011-54479 A).

SUMMARY OF THE INVENTION

In case of a vehicle, for example, the battery charging rate depends largely on traveling condition of a vehicle. Thus, the battery charging rate sometimes may be low when the battery temperature is low (hereinafter referred to as low battery temperature as required). According to the aforementioned method of prohibiting the idling stop, the execution frequency of the idling stop when the battery temperature is low is smaller than that when the battery temperature is high. Thus, there is a fear that that under a situation in which the battery temperature is low, the idling stop which is advantageous for reduction in fuel consumption cannot be executed. This has led to demands for achieving improvement of fuel efficiency by expanding an opportunity of executing the idling stop even when the battery temperature is low. In addition, simplifications and reduction in costs of the structure of the control device for the internal combustion engine for executing the idling stop of the internal combustion engine and the structure of a vehicle and the like provided with the same have been also demanded.

The present invention provides a device and a vehicle which achieve at least part of the above-described objects.

An aspect of the present invention relates to a control device for an internal combustion engine for executing idling stop. The control device includes a threshold setting unit and an execution prohibition unit. The threshold unit sets a threshold of a charging rate of a battery and sets the threshold when the battery temperature is low smaller than that when the battery temperature is high. The threshold is used for determining whether execution of the idling stop is permitted. The execution prohibition unit prohibits execution of the idling stop when the charging rate of the battery is less than the threshold. The threshold is set by the threshold setting unit. In the control device for the internal combustion engine of the present embodiment, when the battery temperature is low, even if the battery charging rate is smaller than when the battery temperature is high, opportunity in which the battery charging rate becomes larger than the threshold which is used for determining whether execution of idling stop is permitted is increased. In this way, the opportunity of executing the idling stop can be increased. As a result, in the control device for the internal combustion engine of the above-described aspect, fuel efficiency at the low battery temperature can be improved.

In the control device of internal combustion engine of this aspect, in order to increase the opportunity of executing idling stop when the battery temperature is low, the threshold which is used for determining whether execution of the idling stop is permitted when the battery temperature is low is only set to be smaller than when the battery temperature is high. Thus, according to the control device for the internal combustion engine of this aspect, simplification of the structure and reduction in cost can be achieved. Further, when the battery temperature is low, battery deterioration when over discharge occurs in charged electricity of the battery is small. Thus, according to the control device of internal combustion engine of this aspect, even if the opportunity of executing the idling stop in a situation in which the battery temperature is low increases, it is possible to prevent a large battery deterioration from occurring easily. Thus, this aspect can prevent durability of the battery from being reduced carelessly.

In the above-described aspect, the execution prohibition unit may release the execution prohibition of the idling stop, when the charging rate of the battery when the idling stop is executed is recovered from a value less than the threshold to a value larger than or equal to the threshold and further the charging rate of the battery is recovered to a value higher by a predetermined range than the threshold. As a result of this configuration, there is a following advantage.

When execution of the idling stop is permitted immediately despite that, the degree of the recovery is so low that the charging rate remains within a predetermined range at the time when the charging rate of the battery upon execution of the idling stop is recovered from a value less than the threshold to a value larger than or equal to the threshold, over discharge of the battery may be induced. The reason is that when the battery temperature is low, the idling stop is executed in a situation in which the recovery of the battery charging rate remains low. However, according to the above-described aspect, prohibition of the idling stop may be continued as long as the degree of recovery of the battery charging rate is within the predetermined range. Thus, it is possible to suppress over discharge of the battery accompanied by execution of the idling stop with the battery charging rate which has not been recovered fully although the battery charging rate has been recovered over the threshold. Further, according to the above-described aspect, when the battery charging rate has been recovered to a higher value by a predetermined range than the threshold, the idling stop can be executed regardless of whether the battery temperature is higher or lower. Thus, according to the above-described aspect, the opportunity of executing the idling stop when the charging rate of the battery has been recovered over the threshold even if the battery temperature is low can be secured. As a result, the above-described aspect can contribute to improvement of fuel efficiency by the idling stop when the charging rate has been recovered even if the battery temperature is low.

The above-described aspect may relate to a vehicle that includes an internal combustion engine, a battery and the control device. The battery is used for starting the internal combustion engine. Then, the control device of the internal combustion engine executes the idling stop of the internal combustion engine. According to this aspect, the opportunity of executing the idling stop in a situation in which the battery temperature is low is secured, so that improvement of fuel efficiency and suppression of deterioration of the battery when a vehicle is traveling can be achieved, thereby leading to simplification of the vehicle structure and reduction in cost.

The aspect of the present invention may be a control device of internal combustion engine. The control device executes idling stop control. And the control device prohibits execution of the idling stop control when the battery charging rate is less than the idling stop prohibition threshold. Further, a smaller value is set to the idling stop prohibition threshold as the battery temperature lowers.

In the above-described aspect, when the execution of the idling, stop control is prohibited and the battery charging rate becomes larger than the idling stop permission threshold, the control device may permit the execution of the idling stop control.

In the above-described aspect, the idling stop permission threshold may be larger than the idling stop prohibition threshold.

In the above-described aspect, the idling stop permission threshold may be larger by a predetermined amount than the idling stop prohibition threshold.

In the above-described aspect, the predetermined amount may be smaller as the battery temperature rises.

Another aspect of the present invention may be a vehicle. The vehicle includes an internal combustion engine, a starter, a battery and a control device. The control device executes idling stop control. And the control device prohibits execution of the idling stop control, when a charging rate of the battery is less than an idling stop prohibition threshold. The idling stop prohibition threshold is smaller as the battery temperature lowers.

In the above-described aspect, when the execution of the idling stop control is prohibited, and the charging rate of the battery becomes larger than an idling stop permission threshold, the control device may permit the execution of the idling stop control.

In the above-described aspect, the idling stop permission threshold may be larger than the idling stop prohibition threshold.

In the above-described aspect, the idling stop permission threshold may be larger by a predetermined amount than the idling stop prohibition threshold.

In the above-described aspect, the predetermined amount may be smaller as the battery temperature rises.

Still another aspect of the present invention may be a control method for an internal combustion engine for executing idling stop control. According to the above-described control method, a battery temperature and a battery charging rate are measured and an idling stop prohibition threshold corresponding to the battery temperature is set. The idling stop prohibition threshold is smaller as the battery temperature lowers. Further, the battery charging rate is compared with the idling stop prohibition threshold. And execution of the idling stop control is prohibited when the battery charging rate is less than the idling stop prohibition threshold.

In the above-described aspect, an idling stop permission threshold corresponding to the battery temperature may be set. Further, the battery charging rate may be compared with the idling stop permission threshold. And the execution of the idling stop control may be permitted when the battery charging rate is larger than the idling stop permission threshold.

In the meantime, the present invention may be achieved in various forms. For example, the present invention may be achieved in forms of a control method of the idling stop control of an internal combustion engine, a control method of a vehicle having idling stop function, and an external terminal such as an inspection device. The inspection device is connected to a vehicle having the idling stop function.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
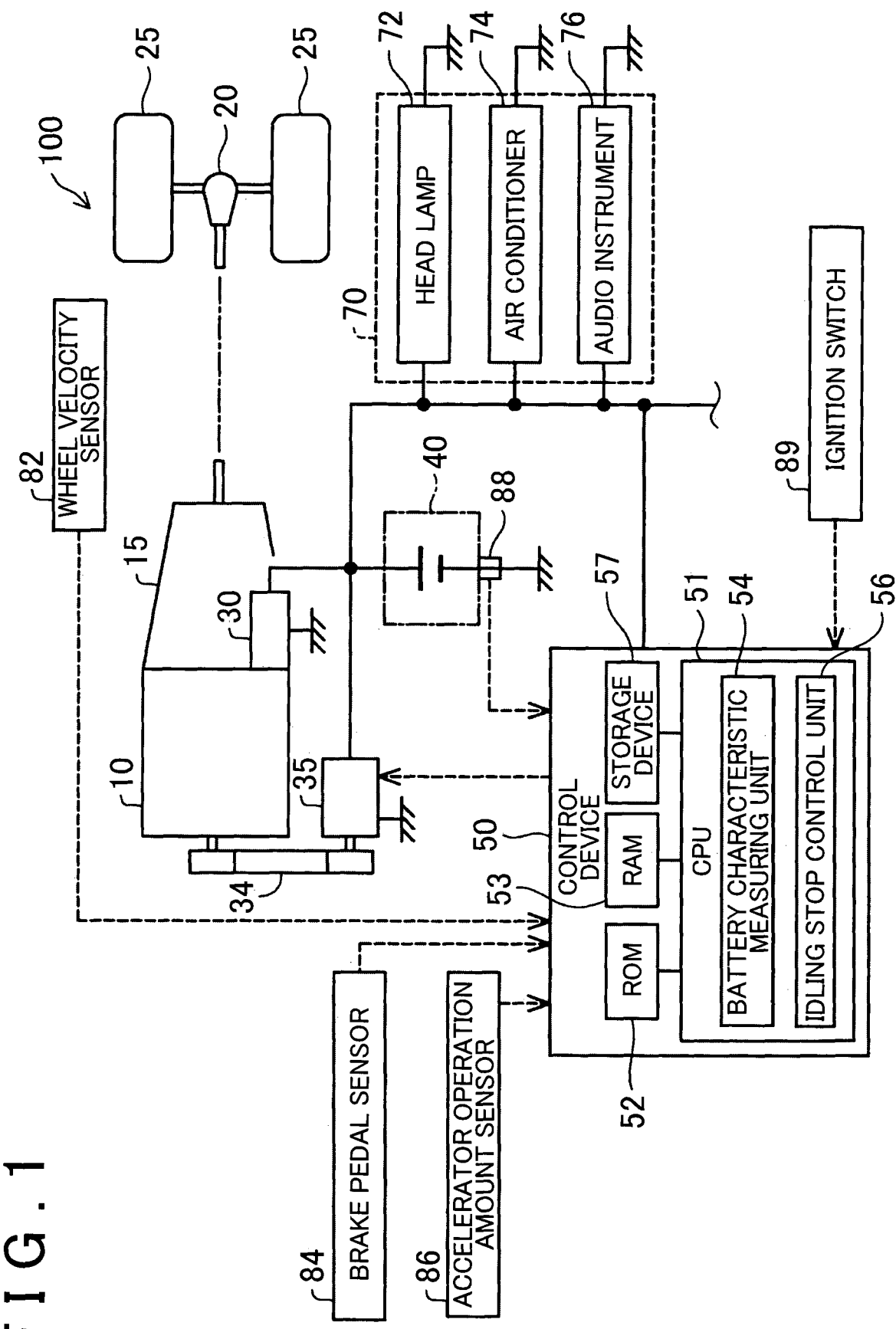
FIG. 1 is an explanatory diagram showing the structure of a vehicle 100 according to an embodiment of the present invention.

Hereinafter, the embodiments of the present invention will be described with reference to the drawings. FIG. 1 is an explanatory diagram showing the structure of a vehicle 100 according to an embodiment of the present invention. The vehicle 100 is a vehicle provided with a control device for internal combustion engine for executing idling stop of the internal combustion engine. The vehicle 100 includes an engine 10, an automatic transmission 15, a differential gear 20, driving wheels 25, a starter 30, an alternator 35, a battery 40, and a control device 50.

The engine 10 is an internal combustion engine configured to generate a motive power by burning fuel such as gasoline, diesel oil. The motive power of the engine 10 is transmitted to the automatic transmission 15 and also the alternator 35 via a driving mechanism 34. An output of the engine 10 is converted by the control device 50 depending on a depression amount of an accelerator pedal (not shown) which is operated by a vehicle driver.

The automatic transmission 15 automatically executes change of transmission gear ratio (so-called shift change). The motive power (engine speed, torque) of the engine 10 is changed by the automatic transmission 15. The changed motive power of the engine 10 is transmitted to right and left driving wheels 25 via the differential gear 20 as a desired engine speed and torque. In this way, the motive power of the engine 10 is changed depending on the depression amount of the accelerator pedal and transmitted to the driving wheels 25 via the automatic transmission 15. Acceleration and deceleration of the vehicle 100 are carried out by the motive power of the engine 10 transmitted in this way.

The driving mechanism 34 transmits the motive power of the engine 10 to the alternator 35. In the present embodiment, a belt drive mechanism is adopted as the driving mechanism 34. The alternator 35 generates electricity by using part of the motive power of the engine 10. Electricity generated by the alternator 35 is used to charge the battery 40 via an inverter (not shown).

The battery 40 supplies electricity to various auxiliary machines 70 provided outside the engine main body. The battery 40 is a lead battery which serves as a DC power supply. The auxiliary machines 70 are peripheral machines provided outside the engine main body. The auxiliary machines 70 include various electrical load apparatuses which operate using electricity from the battery 40. The electrical load apparatuses include a head lamp 72, an air conditioner 74, an audio instrument 76 and the like.

A starter 30 is a starter motor. The starter 30 starts the engine 10 with electricity supplied from the battery 40. When an ignition switch 89 is operated by a driver in order to start an operation of the vehicle 100 in a stop state, the starter 30 is activated so as to start the engine 10. This starter 30 is also used when restarting the engine 10 in an idling stop state.

The control device 50 is constructed as a computer including a CPU 51, a ROM 52, a RAM 53, a storage device 57, and an I/O ports. The starter 30, the alternator 35, the ignition switch 89 as well as various sensors such as a wheel velocity sensor 82, a brake pedal sensor 84, an accelerator operation amount sensor 86, a battery sensor 88 are connected to the I/O ports. The wheel velocity sensor 82 detects a rotational speed of the driving wheel 25. A detected rotational speed is output to the control device 50. The brake pedal sensor 84 detects a depression condition of the brake pedal (not shown). Whether the depression has been detected or not, the depression velocity, the depression amount and the like are output to the control device 50. The accelerator operation amount sensor 86 detects the depression amount of the accelerator pedal (not shown) as the accelerator operation amount. The detected accelerator operation amount is output to the control device 50. The battery sensor 88 is constructed as a sensor group configured to detect battery characteristics including a voltage, current, temperature, internal resistance, capacity, charging receiving performance, SOC (charging rate) and the like of the battery 40. The battery sensor 88 detects a voltage, current, temperature and the like of the battery 40 and outputs a detection result thereof to the control device 50.

The CPU 51 loads a computer program stored in the ROM 52 onto the RAM 53 and executes the program. In this way, the CPU 51 functions as a battery characteristic measuring unit 54 and an idling stop control unit 56. The battery characteristic measuring unit 54 calculates or measures the characteristic of the battery 40 using a sensor output from the battery sensor 88. More specifically, the battery voltage, current, temperature, internal resistance, capacity, charging receiving performance and charging rate (hereinafter referred to as just SOC) which are the battery characteristics are calculated or measured. In this case, the battery temperature may be calculated for estimation from the detected battery voltage, current and the like. Further, the battery temperature may be detected directly using a liquid temperature sensor for detecting the liquid temperature of the battery 40. Further, each of the internal resistance, capacity, charging receiving performance and SOC may be calculated for estimation from the detected battery voltage, current, temperature or the like.

The idling stop control unit 56 executes or prohibits idling stop control. The idling stop control refers to a control adapted to stop the engine 10 when the vehicle 100 is in an idling state. Execution and prohibition of the idling stop control are performed based on the SOC of the battery 40. In the meantime, because a content of the idling stop control has been already known, description thereof is omitted.

Further, execution permission of the idling stop control or prohibition thereof will be described below.

The storage device 57 is a nonvolatile storage medium or storage unit. The storage device 57 stores a correspondence relationship between the battery temperature and a threshold preliminarily and holds it. The threshold is a value which is used for determining whether execution of the idling stop control is permitted. The correspondence relationship between the battery temperature and the threshold will be described below.

Figure 2:
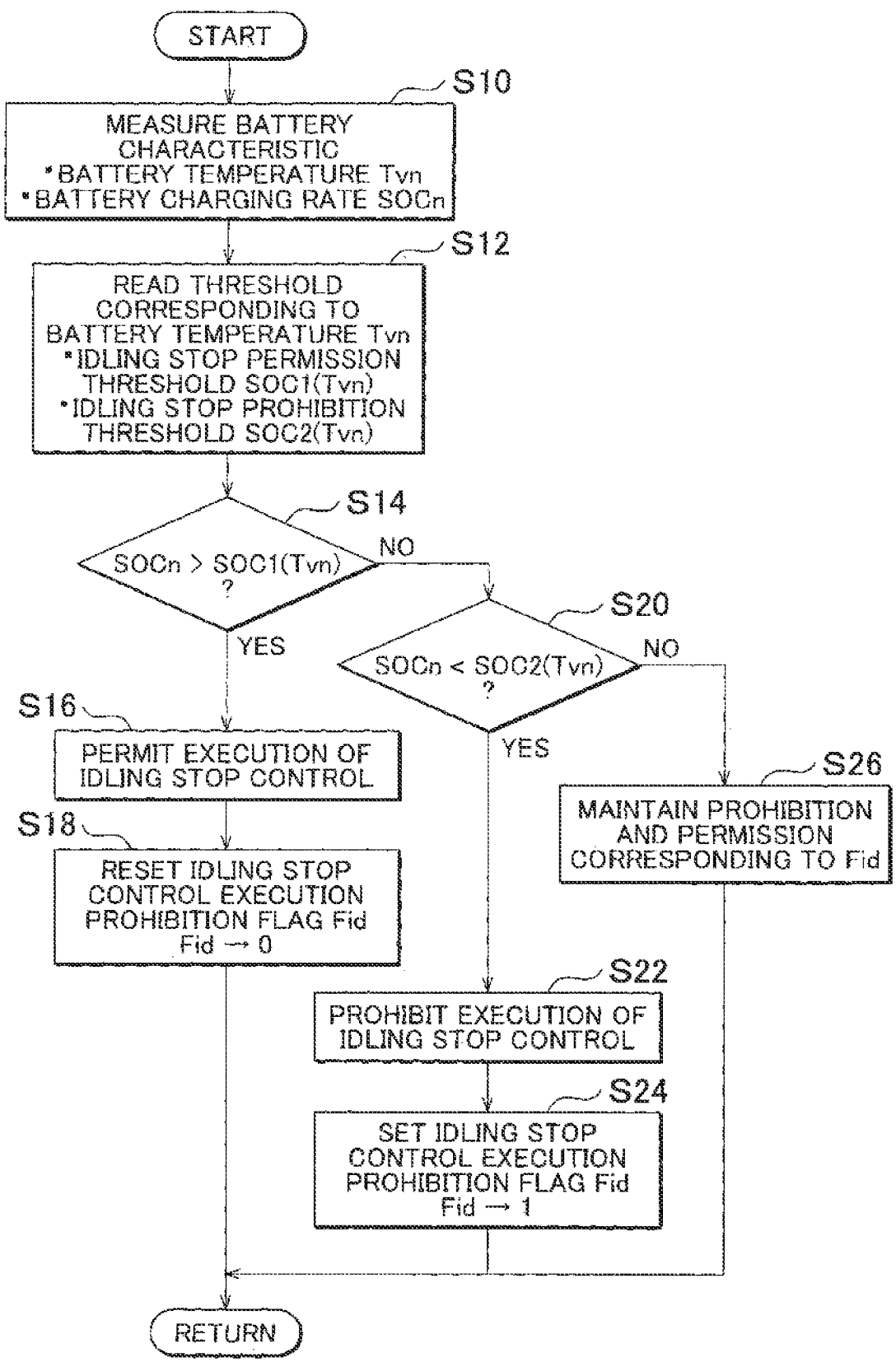
FIG. 2 is a flow chart showing execution determination process for idling stop control to be executed by a control device 50 mounted on the vehicle 100.

Next, the execution condition of the idling stop control which is to be performed in the vehicle 100 according to the present embodiment will be described. FIG. 2 is a flow chart showing execution determination processing for idling stop control to be executed by the control device 50 mounted on the vehicle 100. The execution determination processing of the idling stop control is executed each time when it is determined that the execution condition of the idling stop control has been established by an idling stop control routine (not shown) after the ignition switch 89 is turned on. The execution determination processing of the idling stop control is executed prior to execution of the idling stop control.

In the execution determination processing of the idling stop control, in the control device 50, first, the battery characteristic measuring unit 54 measures the characteristics of the battery 40 using a detected value of the battery sensor 88 (step S10). In this step S10, the battery characteristic measuring unit 54 measures a current battery temperature Tvn and a battery charging rate SOCn about the battery 40. The aforementioned battery temperature Tvn and battery charging rate SOCn are measured as the characteristics of the battery 40.

Figure 3:
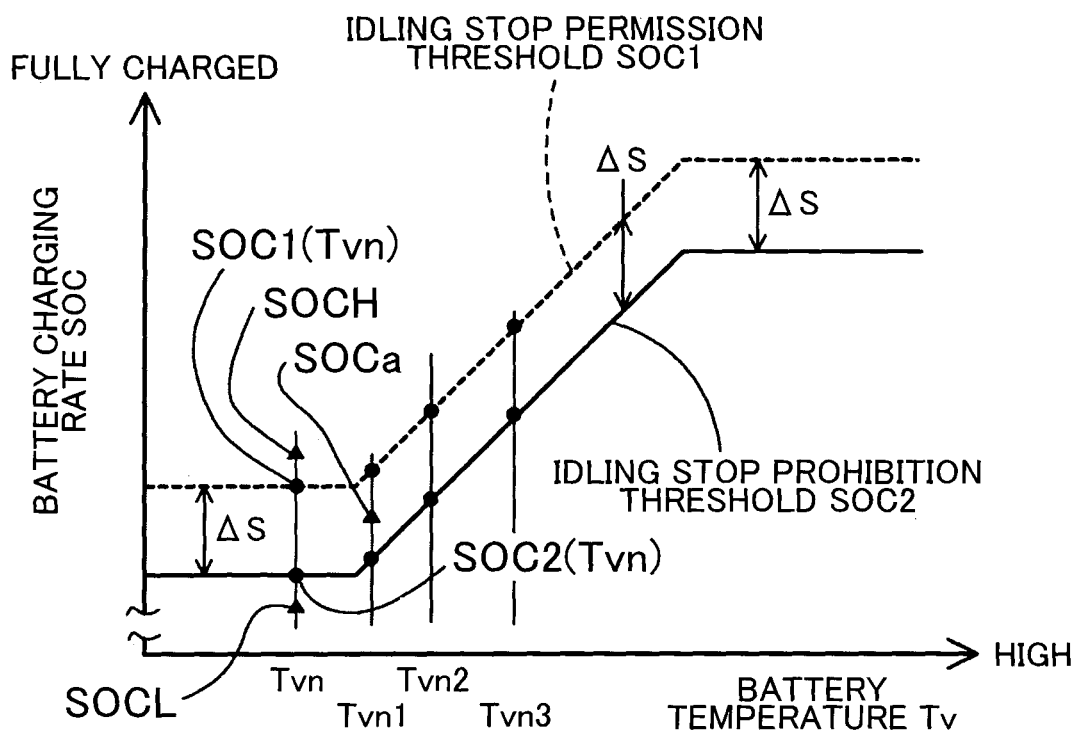
FIG. 3 is a graph showing a correspondence relationship between a battery temperature Tv and an idling stop permission threshold SOC1 and a correspondence relationship between the battery temperature Tv and an idling stop prohibition threshold SOC2.

Subsequently, in the control device 50, the idling stop control unit 56 calculates an idling stop permission threshold SOC1 (Tvn) and an idling stop prohibition threshold SOC2 (Tvn) which correspond to the current battery temperature Tvn obtained in step S10 (step S12). Both the thresholds are calculated as follows. FIG. 3 is a graph showing a correspondence relationship between a battery temperature Tv and an idling stop permission threshold SOC1 and a correspondence relationship between the battery temperature Tv and an idling stop prohibition threshold SOC2. In FIG. 3, the ordinate axis indicates the battery charging rate state of charge ("SOC") and the abscissa axis indicates the battery temperature Tv. FIG. 3 is a diagram in which the both thresholds are plotted with respect to the battery temperature Tv. The correspondence relationship between the battery temperature Tv and the battery charging rate SOC shown in FIG. 3 is obtained preliminarily on manufacturing stage of the vehicle 100 and stored in the storage device 57.

The idling stop permission threshold SOC1 is a threshold which is set to permit execution of the idling stop control adapted to stop and restart the engine 10. When the battery charging rate SOC is higher than or equal to the threshold SOC1$r$, execution of the idling stop control is permitted. Then, this idling stop permission threshold SOC1 is set for each battery temperature Tv. The idling stop permission threshold SOC1 is set throughout an expected battery temperature range from its low temperature range to its high temperature range of the battery temperature Tv which matches with an environment where use of the vehicle 100 is expected. Then, the idling stop permission threshold SOC1 is set in such a stepwise manner that values of the threshold in the low temperature range are smaller than those in the high temperature range, as shown in the figure. According to the present embodiment, a value of the idling stop permission threshold SOC1 in the high temperature range is assumed to be substantially equal to a threshold when the idling stop control is executed according to any existing method.

The idling stop prohibition threshold SOC2 is a threshold which is set to prohibit execution of the idling stop control adapted to stop and restart the engine 10. When the battery charging rate SOC is less than the aforementioned threshold SOC2, execution of the idling stop control is prohibited. Then, this idling stop prohibition threshold SOC2 is set for each battery temperature Tv throughout the aforementioned expected battery temperature range. The idling stop prohibition threshold SOC2 is set in such a stepwise manner that values of the threshold in the low temperature range are smaller than those in the high temperature range as shown in the figure. In the present embodiment, the difference in charging rate ΔS between the idling stop permission threshold SOC1 and the idling stop prohibition threshold SOC2 is assumed to be substantially constant throughout the expected battery temperature range. Then, the values of the idling stop prohibition threshold SOC2 in the high temperature range is also reduced by only the difference in charging rate ΔS compared to the threshold when executing the idling stop control according to the existing method. This is because the values of the idling stop permission threshold SOC1 in the high temperature range are assumed to be substantially equal to the threshold when executing the idling stop control according to the existing method. The difference in charging rate ΔS is set according to various experiments using an actual vehicle as the vehicle 100, computer analytical method or the like. Further, when setting the idling stop prohibition threshold SOC2 in the low temperature range to be smaller than that in the high temperature range, the values of the idling stop prohibition threshold SOC2 in the low temperature range are set according to various experiments using an actual vehicle as the vehicle 100, computer analytical method or the like while considering the charging/discharging characteristics of the battery 40. The aforementioned idling stop prohibition threshold SOC2 is a threshold which is used for determining whether execution of the idling stop control is permitted and the same thing can be said of the idling stop permission threshold SOC1 also.

In calculation of the threshold in step S12, the idling stop control unit 56 refers to the graph of FIG. 3 which has been stored in the storage device 57. Then, the idling stop permission threshold SOC1 (Tvn) and the idling stop prohibition threshold SOC2 (Tvn) which correspond to a current battery temperature Tvn of the battery 40 obtained in step S10 are obtained. In FIG. 3, both the thresholds are indicated with black circles on the battery temperature Tvn. In the meantime, black triangles in the figure indicate a current battery charging rate SOCn obtained in step S10 when the battery temperature Tv is the current battery temperature Tvn obtained through execution determination processing of the idling stop control of FIG. 2. The same thing can be said also when the battery temperature Tv is battery temperature Tvn1 to Tvn3 as indicated in the figure.

Subsequent to the aforementioned calculation of the both thresholds, in the control device 50, the idling stop control unit 56 compares the current battery charging rate SOCn with the idling stop permission threshold SOC1 (Tvn). Then, the idling stop control unit 56 determines whether the battery charging rate SOCn is larger than the idling stop permission threshold SOC1(Tvn) (step S14). Here, when the idling stop control unit 56 makes an affirmative determination (SOCn>SOC1(Tvn)), the idling stop control unit 56 permits execution of the idling stop control (step S16). Thus, in response to the permission of execution in step S16, the idling stop control unit 56 executes the known idling stop control for the engine 10 according to the idling stop control routine (not shown). Subsequent to step S16, the idling stop control unit 56 resets idling stop execution prohibition flag Fid (step S18) and terminates this routine temporarily. This idling stop execution prohibition flag Fid indicates prohibition of execution of the idling stop control of the engine 10 and its initial value is assumed to be zero. When the value of the idling stop execution prohibition flag Fid is zero, execution of the idling stop control of the engine 10 is permitted. That is, what the idling stop execution prohibition flag Fid is zero means that actually the idling stop control is executed.

On the other hand, when the idling stop control unit 56 makes a negative determination in step S14, the idling stop control unit 56 of the control device 50 compares the current battery charging rate SOCn with the idling stop prohibition threshold SOC2 (Tvn). Then, the idling stop control unit 56 determines whether the battery charging rate SOCn is smaller than the idling stop prohibition threshold SOC2 (Tvn) (step S20). Here when the idling stop control unit 56 makes an affirmative determination (SOCn<SOC2(Tvn)), the idling stop control unit 56 prohibits execution of the idling stop control (step S22). Thus, even if the idling stop control is executed according to the idling stop control routine (not shown), the idling stop control unit 56 prohibits execution of the known idling stop control of the engine 10 in response to the prohibition of execution in this step S22. Subsequent to step S22, the idling stop control unit 56 sets 1 to the idling stop execution prohibition flag Fid (step S24) and terminates this routine temporarily. When the idling stop execution prohibition flag Fid is set in step S24, execution of the idling stop control of the engine 10 is prohibited. That is, what the idling stop execution prohibition flag Fid is 1 means that no idling stop control is executed.

Further, when the idling stop control unit 56 makes a negative determination in step S20, the idling stop control unit 56 of the control device 50 maintains execution permission or execution prohibition of the idling stop control corresponding to the idling stop execution prohibition flag Fid (step S26) and terminates this routine temporarily. Hereinafter, maintaining execution permission or execution prohibition of the idling stop control in this step S26 will be described. For the description, it is assumed that the execution determination processing of the idling stop control of FIG. 2 has been repeated continuously. At that time, it is assumed that the battery temperature Tv upon each processing has changed from the battery temperature Tvn to a battery temperature Tvn1 and that the battery charging rate SOC has changed to a battery charging rate SOCa which belongs to the difference in charging rate ΔS. The changes in battery temperature Tv and battery charging rate SOC are indicated in FIG. 3 and with black triangles in FIG. 3. Further, the battery charging rate SOC corresponding to the battery temperature Tvn will be described by dividing it to a case of battery charging rate SOCH and a case of battery charging rate SOCL. The battery charging rate SOCH is a battery charging rate which is higher than the idling stop permission threshold SOC1 (Tvn) corresponding to the battery temperature Tvn. The battery charging rate SOCL is a battery charging rate which is lower than the idling stop prohibition threshold SOC2 (Tvn).

Now assuming that in step S10, the battery temperature Tvn and the battery charging rate SOCH are obtained, in FIG. 2, the idling stop control unit 56 makes an affirmative determination (SOCH>SOCH1(Tvn)) in step S14 and performs processing of steps S16 to S18. Thus, in this case, the idling stop control is executed according to the idling stop control routine (not shown) as described above, so that the idling, stop execution prohibition flag Fid is reset to the value of 0. In step S10 of execution determination processing of the idling stop control of FIG. 2 next to this situation, it is assumed that the battery temperature Tv is battery temperature Tvn1 and that the battery charging rate corresponding to this is battery charging rate SOCa. At this time, in FIG. 2, the idling stop control unit 56 makes a negative determination (SOCa<SOC1(Tvn)) in step S14 and also in subsequent step S20, makes a negative determination (SOCa>SOC2(Tvn)). Thus, in this case, in step S26, the execution permission of the idling stop control is maintained corresponding to the idling stop execution prohibition flag Fid (=0) which has been reset in the previous processing. On the other hand, when the battery charging rate SOCa is lower than the idling stop prohibition threshold SOC2 in step S10 (FIG. 3: battery temperature Tvn1) about next execution determination processing of the idling stop control of FIG. 2, a following processing is executed. At this time, in FIG. 2, the idling stop control unit 56 makes a negative determination (SOCa<SOC2(Tvn)<SOC1(Tvn)) and in subsequent step S20, makes an affirmative determination (SOCa<SOC2(Tvn)). Thus, in this case, execution of the idling stop control is prohibited (steps S22 to S24). That is, when the battery charging rate SOC which is larger than the idling stop permission threshold SOC1 drops below the idling stop prohibition threshold SOC2 across the difference in charging rate ΔS, the idling stop control changes from execution permission to execution prohibition.

Further, in step S10 (FIG. 3: battery temperature Tvn2) about next execution determination processing of the idling stop control of FIG. 2, when the battery charging rate SOC remains belonging to the difference in charging rate ΔS, the execution permission of the idling stop control corresponding to the idling stop execution prohibition flag Fid (=0) is maintained. Contrary to this, when, the battery charging rate SOC is lower than the idling stop prohibition threshold SOC2 in step S10 (FIG. 3: battery temperature Tvn2) about next execution determination processing of the idling stop control of FIG. 2, execution of the idling stop control is prohibited in response to the negative determination in step S14 and the affirmative determination in step S20 (steps S22 to S24).

In addition, when the battery charging rate with respect to the battery temperature Tvn is battery charging rate SOCL in step S10, execution of the idling stop control is prohibited in response to the negative determination (SOCL<SOC1 (Tvn)) in step S14 and the affirmative determination (SOCH<SOC2(Tvn)) in step S20 of FIG. 2 (steps S22 to S24). Thus, in this case, as described above, execution of the idling stop control according to the idling stop control routine (not shown) is prohibited and the idling stop execution prohibition flag Fid is set to 1. In step S10 about next execution determination processing of the idling stop control of FIG. 2 under this situation, it is assumed that the battery temperature Tv is battery temperature Tvn1 and the corresponding battery charging rate SOC is battery charging rate SOCa. At this time, in FIG. 2, the idling stop control unit 56 makes a negative determination (SOCa<SOC1(Tvn)) in step S14 and in subsequent step S20 also, makes the negative determination (SOCa>SOC2(Tvn)). Thus, in this case, in step S26, the execution prohibition of the idling stop control is maintained corresponding to the idling stop execution prohibition flag Fid (=1) which has been set in the previous processing. On the other hand, when, the battery charging rate SOCa is higher than the idling stop permission threshold SOC1 in step S10 (FIG. 3: battery temperature Tvn1) about next execution determination processing of the idling stop control of FIG. 2, a following processing is executed. At that time, in FIG. 2, the idling stop control unit 56 makes an affirmative determination (SOCa>SOC1(Tvn)) in step S14. Thus, execution of the idling stop control is permitted (steps S16 to S18). That is, when the battery charging rate SOC which is smaller than the idling stop prohibition threshold SOC2 becomes higher than the idling stop permission threshold SOC1 across the difference in charging rate ΔS, the idling stop control changes from execution prohibition to execution permission.

Further, when the battery charging rate SOC remains belonging to the difference in charging rate ΔS in step S10 (FIG. 3: battery temperature Tvn2) about next execution determination processing of the idling stop control of FIG. 2, execution prohibition of the idling stop control corresponding to the idling stop execution prohibition flag Fid (=1) is maintained. Contrary to this, when the battery charging rate SOC becomes higher than the idling stop permission threshold SOC1 in step S10 (FIG. 3: battery temperature Tvn2) about next execution determination processing of the idling stop control of FIG. 2, execution of the idling stop control is permitted in correspondence to the affirmative determination of step S14 (steps S 16 to S18). In the meantime, although FIG. 3 describes cases of the battery temperature Tv and the battery temperature Tvn1 in a temperature range in which the battery temperature is low, the same thing can be said of a case where the battery temperature Tv is in a high temperature range.

In the vehicle 100 of the present embodiment having the structure described above, the battery charging rate SOC of the battery 40 for use in starting the engine 10 is stored in the storage device 57 of the control device 50 for each battery temperature Tv. The vehicle 100 of the present embodiment stores the battery charging rate SOC as the idling stop prohibition threshold SOC2 which prohibits execution of the idling stop control. Then, in the vehicle 100 of the present embodiment, when the battery charging rate SOC is lower than the idling stop prohibition threshold SOC2 (step S20: affirmative determination) when executing the idling stop, execution of the idling stop control is prohibited by the idling stop control unit 56 of the control device 50. In this way, as regards the idling stop prohibition threshold SOC2 which prohibits execution of the idling stop control, the idling stop prohibition threshold SOC2 at the battery temperature Tv in the low temperature range is set to be smaller than the idling stop prohibition threshold at the battery temperature Tv in the high temperature range. Thus, in the vehicle 100 of the present embodiment, even if the battery charging rate SOC of the battery 40 at the battery temperature Tv in the low temperature range is smaller than the battery charging rate SOC in the high temperature range, an opportunity in which the battery charging rate SOC at the battery temperature Tv in the low temperature range agrees with or exceeds the idling stop prohibition threshold SOC2 is increased by the control device 50. As a result, in the vehicle 100 of the present embodiment, the opportunity in which the idling stop control is executed at the battery temperature Tv in the low temperature range can be increased by the control device 50, thereby improving fuel efficiency when the battery temperature is low.

In the vehicle 100 of the present embodiment, the opportunity of executing the idling stop control at the battery temperature Tv in the low temperature range is increased by the idling stop control unit 56. Thus, at the low battery temperatures, the vehicle 100 of the present embodiment is only configured to store the idling stop prohibition threshold SOC2 to be smaller than when the battery temperature is high. Thus, in the vehicle 100 of the present embodiment, not only simplification of the structure and reduction in cost of the control device but also simplification of the structure of the vehicle and reduction in cost thereof can be achieved by means of the control device 50.

By the way, when the battery temperature is low, the opportunity of executing the idling stop control at the battery temperatures Tv in the low temperature range can be intensified by increasing the battery charging rate SOC, thereby improving fuel efficiency. However, in the vehicle 100 of the present embodiment, the opportunity of executing the idling stop control at the battery temperatures Tv in the low temperature range is increased by means of the idling stop control unit 56. At this time, apparatuses for improving the battery charging rate SOC and control thereof when the battery temperature is low are unnecessary. Thus, in the vehicle 100 of the present embodiment, not only simplification of the structure and reduction in cost of the control device but also simplification of the structure and reduction in cost of the vehicle can be achieved further by means of the control device 50.

The battery 40 which the vehicle 100 possesses has a structure which functions as a lead storage battery as DC power supply. Thus, when the battery temperature is low, battery deterioration when over discharge occurs in charged electricity of the battery is small. Thus, in the vehicle 100 of the present embodiment, even if the opportunity of executing the idling stop control at the battery temperatures Tv in the low temperature range is increased by the control device 50, it is possible to prevent a large battery deterioration from occurring easily. Therefore, the vehicle 100 of the present embodiment is advantageous for maintenance or improvement of the durability of the battery 40.

In the vehicle 100 of the present embodiment, when the battery charging rate SOC is recovered from a value lower than the idling stop prohibition threshold SOC2 to a value higher than the idling stop prohibition threshold SOC2, it is determined whether the idling stop control is permitted when the charging rate has been recovered as follows depending on the degree of the recovery. In the vehicle 100 of the present embodiment, when the battery charging rate SOC which is smaller than the idling stop prohibition threshold SOC2 becomes higher than the idling stop permission threshold SOC1 across the difference in charging rate ΔS, execution of the idling stop control is permitted. That is, when the battery charging rate SOC which is lower than the idling stop prohibition threshold SOC2 is recovered with such a recovery degree that it exceeds at least the difference in charging rate ΔS, prohibition of execution of the idling stop control is released by the idling stop control unit 56 and execution of the idling stop control is permitted. As a result, there are following advantages.

When the battery charging rate SOCL which is smaller than the idling stop prohibition threshold SOC2 has been recovered only to the battery charging rate SOCa included in the difference in charging rate ΔS as shown in FIG. 3, the degree of the recovery is insufficient to and smaller than the difference in charging rate ΔS. In this case, when execution of the idling stop control is permitted immediately despite the small degree of the recovery, the idling stop control is executed with a small battery charging rate SOC. The recovery of the battery charging rate SOC at this time is small in a situation in which the battery temperature is low so that the battery charging rate SOC is less than the idling stop permission threshold SOC1. When the idling control is executed in such a situation, over discharge of the battery 40 may be induced. However, in the vehicle 100 of the present embodiment, When the degree of the recovery of the battery charging rate SOC of the battery 40 is in a range of the difference in charging rate ΔS from the idling stop prohibition threshold SOC2, the idling stop control remains prohibited by the idling stop control unit 56. Thus, in the vehicle 100 of the present embodiment, the idling stop control unit 56 can suppress over discharge of the battery accompanied by execution of the idling stop control with a small battery charging rate SOC which does not satisfy the idling stop permission threshold SOC1 in a situation in which the recovery of the battery charging rate SOC remains low.

In the vehicle 100 of the present embodiment, as for the degree of the recovery of the battery charging rate SOC of the battery 40, when the battery charging rate SOC exceeds the difference in charging rate ΔS from the idling stop prohibition threshold SOC2 and exceeds the idling stop permission threshold SOC1, execution of the idling stop control is permitted regardless of whether the battery temperature Tv is high or low. Thus, in the vehicle 100 of the present embodiment, when the battery charging rate is recovered at least across the difference in charging rate ΔS from the idling stop prohibition threshold SOC2, execution of the idling stop control is permitted by the idling stop control unit 56. In this way, even when the battery temperature is low, the opportunity of executing the idling stop control can be secured. That is, fuel efficiency when the battery temperature is low can be improved by the idling stop control when the charging rate SOC of the battery 40 is recovered.

In the vehicle 100 of the present embodiment, the idling stop permission threshold SOC1 (Tvn) which permits execution of the idling stop control at the battery temperatures Tv in the low temperature range is set to be smaller than the idling stop permission threshold in the high temperature range. Thus, in the vehicle 100 of the present embodiment, even if the battery charging rate SOC of the battery 40 is smaller than the battery charging rate SOC in the high temperature range when the battery temperatures Tv is in the low temperature range, the opportunity in which the battery charging rate SOC when the battery temperatures Tv is in the low temperature range agrees with or exceeds the idling stop permission threshold SOC1 is increased. As a result, in the vehicle 100 of the present embodiment, the control device 50 can increase the opportunity of executing the idling stop control at the battery temperatures Tv in the low temperature range by the idling stop permission threshold SOC1 also. Thus, the vehicle 100 of the present embodiment can improve fuel efficiency when the battery temperature is low.

The present invention is not restricted to the above-described embodiments, but may be embodied in various configurations within a range not departing from a gist thereof. For example, technical features of embodiments corresponding to technical features of each embodiment described in the paragraph regarding the summary of the invention may be replaced or combined appropriately to solve part or all of the above-described objects or achieve part or all of the above-described effects. Further, the technical features may be removed appropriately unless they are described as indispensable elements in the present specification.

Although the vehicle 100 of the above-described embodiments is provided with the idling stop permission threshold SOC1 and the idling stop prohibition threshold SOC2, any one of the thresholds may be provided. In this case, when the battery charging rate drops below any one of the thresholds, execution of the idling stop control may be prohibited and when it exceeds any one of the thresholds, execution of the idling stop control may be permitted.

In the vehicle 100 of the above-described embodiments, as shown in FIG. 3, the idling stop permission threshold SOC1 and the idling stop prohibition threshold SOC2 are set in the stepwise manner over an expected battery temperature range which matches with an environment in which use of the vehicle 100 is expected. In addition, the idling stop permission threshold SOC1 and the idling stop prohibition threshold SOC2 may be set such that they increase according to a linear function from low temperatures to high temperatures or may be set such that they increase gradually according to a quadratic function.

Figure 4:
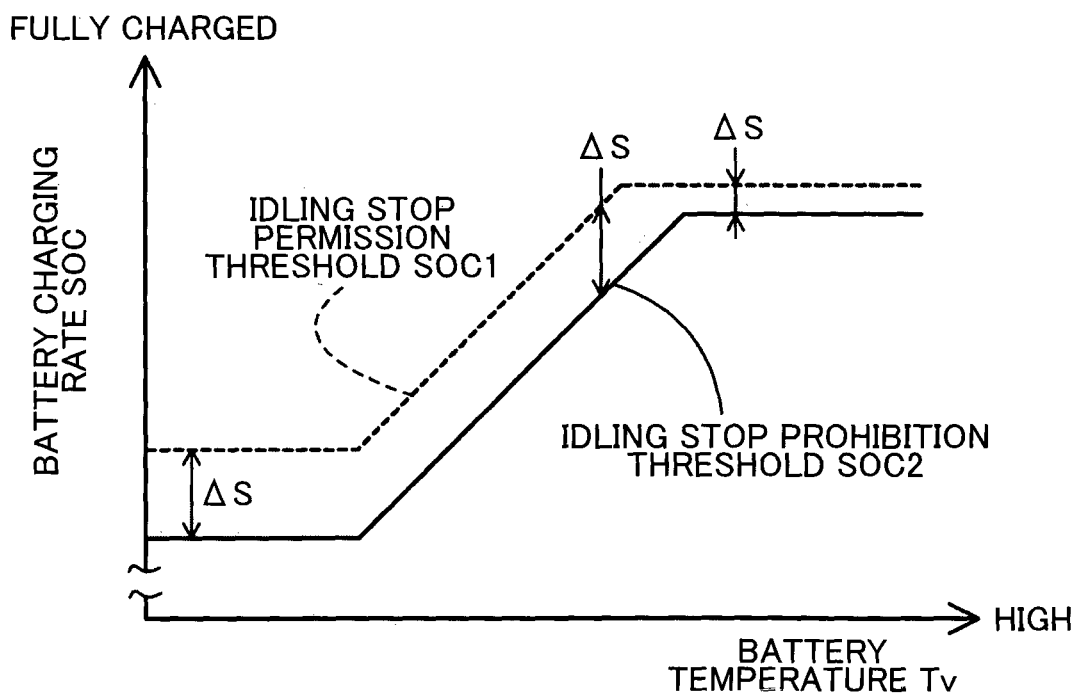
FIG. 4 is a graph showing a correspondence relationship between the battery temperature Tv and the both thresholds in an embodiment in which there is a provided difference in charging rate ΔS between the idling stop permission threshold SOC1 and the idling stop prohibition threshold SOC2.

Although in the vehicle 100 of the above-described embodiments, the difference in charging rate ΔS between the idling stop permission threshold SOC1 and the idling stop prohibition threshold SOC2 is set to be substantially constant throughout an expected battery temperature range which matches with an environment in which use of the vehicle 100 is expected, the present invention is not restricted to this example. FIG. 4 is a graph showing a correspondence relationship between the battery temperature Tv and both the thresholds in an embodiment in which the difference in charging rate ΔS between the idling stop permission threshold SOC1 and the idling stop prohibition threshold SOC2 is provided with a difference. As indicated in the figure, in the present embodiment, the difference in charging rate ΔS in the high temperature range is set to be smaller. As a result, in the high temperature range in which the difference in charging rate ΔS is small, when the battery charging rate SOC is recovered only by an amount exceeding the small difference in charging rate ΔS from a value smaller than the idling stop prohibition threshold SOC2 so that it exceeds the idling stop permission threshold SOC1, execution of the idling stop control is permitted. Thus, in the high temperature range in which the difference in charging rate ΔS from the idling stop prohibition threshold SOC2 is decreased, the opportunity of executing the idling stop control can be increased thereby improving fuel consumption.

The invention claimed is:

1. A control device for an internal combustion engine for executing idling stop, the control device comprising:
a CPU, a non-transitory memory, and at least one input/output port configured to:
obtain a charging rate of a battery and a temperature of the battery;
set an idling stop prohibition threshold based on the obtained battery temperature, wherein when the battery temperature is low, the idling stop prohibition threshold is smaller than when the battery temperature is high, wherein the idling stop prohibition threshold is used for determining whether execution of the idling stop is permitted; and
prohibit the execution of the idling stop when the charging rate of the battery is less than the idling stop prohibition threshold.

2. The control device according to claim 1, wherein
the CPU, the non-transitory memory, and the at least one input/output port are further configured to release the execution prohibition of the idling stop, when the charging rate of the battery when the idling stop is executed is recovered from a value less than the idling stop prohibition threshold to a value higher than the idling stop prohibition threshold by a predetermined amount.

3. A vehicle comprising:
an internal combustion engine;
a battery that is used for starting the internal combustion engine; and
the control device according to claim 1 which executes the idling stop of the internal combustion engine.

4. A control device for an internal combustion engine, comprising:
a CPU, a non-transitory memory, and at least one input/output port, wherein
the CPU, the non-transitory memory, and the at least one input/output port are configured to:
(1) execute idling stop control, and
(2) prohibit execution of the idling stop control when a charging rate of a battery is less than an idling stop prohibition threshold, a smaller value being set to the idling stop prohibition threshold as a battery temperature lowers.

5. The control device according to claim 4, wherein
when the execution of the idling stop control is prohibited and the charging rate of the battery becomes larger than an idling stop permission threshold, the CPU, the non-transitory memory, and the at least one input/output port are configured to permit the execution of the idling stop control.

6. The control device according to claim 5, wherein
the idling stop permission threshold is larger than the idling stop prohibition threshold.

7. The control device according to claim 6, wherein
the idling stop permission threshold is larger by a predetermined amount than the idling stop prohibition threshold.

8. The control device according to claim 7, wherein
the predetermined amount is smaller as the battery temperature rises.

9. A vehicle comprising:
an internal combustion engine;
a starter;
a battery; and
a control device comprising a CPU, a non-transitory memory, and at least one input/output port,
wherein the CPU, the non-transitory memory, and the at least one input/output port are configured to:
(a) execute idling stop control, and
(b) prohibit execution of the idling stop control when a charging rate of the battery is less than an idling stop prohibition threshold, the idling stop prohibition threshold being smaller as a battery temperature lowers.

10. The vehicle according to claim 9, wherein
when the execution of the idling stop control is prohibited and the charging rate of the battery becomes larger than an idling stop permission threshold, the CPU, the non-transitory memory, and the at least one input/output port are configured to permit the execution of the idling stop control.

11. The vehicle according to claim 10, wherein
the idling stop permission threshold is larger than the idling stop prohibition threshold.

12. The vehicle according to claim 11, wherein
the idling stop permission threshold is larger by a predetermined amount than the idling stop prohibition threshold.

13. The vehicle according to claim 12, wherein
the predetermined amount is smaller as the battery temperature rises.

14. A control method for an internal combustion engine for executing idling stop control, the control method comprising:
   measuring a battery temperature and a battery charging rate;
   setting an idling stop prohibition threshold corresponding to the battery temperature, the idling stop prohibition threshold being smaller as the battery temperature lowers;
   comparing the battery charging rate with the idling stop prohibition threshold; and
   prohibiting the execution of idling stop control when the battery charging rate is less than the idling stop prohibition threshold.

15. The control method for internal combustion engine according to claim 14 further comprising:
   setting an idling stop permission threshold corresponding to the battery temperature;
   comparing the battery charging rate with the idling stop permission threshold; and
   permitting the execution of idling stop control when the battery charging rate is larger than the idling stop permission threshold.

* * * * *